(12) United States Patent
Tsai et al.

(10) Patent No.: US 8,060,768 B2
(45) Date of Patent: Nov. 15, 2011

(54) POWER SAVING METHOD OF PORTABLE INTERNET DEVICE AND PORTABLE INTERNET DEVICE THEREOF, AND INSTANT MESSAGING SYSTEM USING THE SAME

(75) Inventors: Chieh-Chih Tsai, Taipei Hsien (TW); Yung-Sen Lin, Taipei Hsien (TW); Chuan-Ming Tsai, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 381 days.

(21) Appl. No.: 12/317,906

(22) Filed: Dec. 30, 2008

(65) Prior Publication Data

US 2010/0042856 A1 Feb. 18, 2010

(30) Foreign Application Priority Data

Aug. 12, 2008 (TW) ................................ 97130717 A

(51) Int. Cl.
*G06F 1/00* (2006.01)
(52) U.S. Cl. ........................................ 713/323; 713/324
(58) Field of Classification Search .................. 713/320, 713/323, 324; 342/357.73, 357.74
See application file for complete search history.

(56) References Cited

U.S. PATENT DOCUMENTS

| 7,209,949 B2* | 4/2007 | Mousseau et al. ............. 709/206 |
| 7,685,606 B2* | 3/2010 | Chang ........................... 719/318 |
| 2007/0124386 A1 | 5/2007 | Klassen |
| 2008/0052548 A1* | 2/2008 | Olsen et al. ................... 713/310 |
| 2009/0313484 A1* | 12/2009 | Millet et al. ................... 713/300 |
| 2010/0115259 A1* | 5/2010 | Elsila et al. .................... 713/100 |
| 2010/0275033 A1* | 10/2010 | Gillespie et al. .............. 713/182 |

FOREIGN PATENT DOCUMENTS

| CN | 1784050 | 6/2006 |
| CN | 1937818 | 3/2007 |
| DE | 102004047689 | 4/2006 |
| EP | 1962473 | 8/2008 |
| JP | 08-172672 | 7/1996 |
| JP | 2000-165419 | 6/2000 |
| JP | 2005-295414 | 10/2005 |
| JP | 2006-311585 | 11/2006 |
| JP | 2007-148937 | 6/2007 |
| JP | 2008-107906 | 5/2008 |
| WO | 2005072494 | 8/2005 |

OTHER PUBLICATIONS

"Office Action of Australian Counterpart Application" issued on Jan. 18, 2010, p. 1-p. 2.
"Search Report of European Counterpart Application" issued on Aug. 18, 2009, p. 1-p. 15.
"First Office Action of China Counterpart Application", issued on Jun. 22, 2011, p1-p5.
"Office Action of Japan Counterpart Application", issued on Jan. 4, 2011, p1-p4, in which the listed references were cited.

* cited by examiner

*Primary Examiner* — Khanh Dang
(74) *Attorney, Agent, or Firm* — Jianq Chyun IP Office

(57) ABSTRACT

The present invention discloses a power saving method of a portable Internet device, the portable Internet device and its instant messaging system. If a screen of the portable Internet device is in non-view state, for example, both backlight module and LCD panel are turned off, it means that a user is not viewing the screen, and thus the message update frequency of the instant messaging program is lowered to prevent unnecessary transmission and receiving of wireless signals, so as to reduce power comsumption of the portable Internet device.

15 Claims, 7 Drawing Sheets

POWER SAVING METHOD OF PORTABLE INTERNET DEVICE AND PORTABLE INTERNET DEVICE THEREOF, AND INSTANT MESSAGING SYSTEM USING THE SAME

BACKGROUND OF THE INVENTION

1. Field of the Invention

The present invention relates to a power saving method of a portable Internet device, and more particularly to a method of reducing the power consumption for using an instant messaging service on a portable Internet device.

2. Description of the Related Art

At present, increasingly more people are using portable Internet devices such as mobile phones or instant messaging devices for instant messaging services. However, when a portable device is connected to the Internet for the use of the instant messaging service, it is very important to increase the operating time of the device. After a user logs on an instant messaging platform, the portable device will keep transmitting updated data with the server platform to timely update the status of all contact persons. If the number of contact persons increases rapidly, then the frequency of updated data downloaded from the portable Internet device and the data volume will become increasingly larger, and thus result in an increasingly larger battery power consumption of the portable Internet device.

If the user leaves the portable Internet device idle without closing the instant messaging program, then the instant messaging program will keep transmitting updated data with the instant messaging platform frequently, and thus result in unnecessary power consumption of the portable Internet device.

SUMMARY OF THE INVENTION

Therefore, one of objectives of at least one embodiment of the present invention to overcome the foregoing shortcomings of the prior art by providing a power saving method of a portable Internet device, the portable Internet device and its instant messaging system to prevent unnecessary power consumption of the portable Internet device.

At least one embodiment of the present invention discloses a power saving method of a portable Internet device, and the portable Internet device executes an instant messaging program. The power saving method comprises the following steps. First; a display unit of the portable Internet device is monitored, and if the display unit is in a view state, an instant messaging program is driven to enter to a first mode; and if the display unit is in a non-view state, the instant messaging program is driven to enter to a second mode, wherein the message update frequency of the instant messaging program in the second mode is lower than message update frequency of the instant messaging program in the first mode.

Preferably, the display unit comprises a backlight module and an LCD panel, and the view state or non-view state of the display unit is related to power-on or power-off of the backlight module and the LCD panel.

Preferably, the power saving method of the invention further comprises steps of providing a proxy, and connecting the proxy when executing an instant messaging program, and transmitting user ID information to an instant messaging platform through the proxy to complete a logon procedure, and transmitting data with the instant messaging platform through the proxy.

Preferbly, when the instant messaging program enters into the second mode, the proxy temporarily stores a data from the instant messaging platform to lower the frequency of receiving data by the portable Internet device.

Preferaly, the proxy further receives a paging of the portable Internet device through a wireless communication base station connected to the portable Internet device, and determines whether or not the instant messaging program is still running according to the paging.

Besides, at least one embodiment of the present invention discloses a portable Internet device, comprising a wireless network transmission unit, a display unit, an instant messaging unit, a processing unit and a power supply unit. The instant messaging unit is capable of transmitting or receiving the instant message through the wireless network transmission unit. The processing unit is electrically coupled to the wireless network transmission unit, the instant messaging unit and the display unit, and capable of controlling the display unit to enter into a view state or a non-view state. The power supply unit supplies electric power required for operation of the portable Internet device. If the display unit enters into the view state, then the instant messaging unit will enter into a first mode. If the display unit enters into the non-view state, then an instant messaging program unit will enter into a second mode, and the message update frequency of the instant messaging unit in the second mode is lower than the message update frequency of the instant messaging unit in the first mode.

Preferably, the display unit further comprises a backlight module and an LCD panel, and the view state or non-view state of the display unit is related to the power-on or power-off of the backlight module and the LCD panel.

Preferably, the instant messaging unit further connects a proxy, and transmits user ID information to an instant messaging platform through the proxy to complete a logon procedure, and transmits data with the instant messaging platform through the proxy.

Besides, at least one embodiment of the present invention further discloses an instant messaging system comprising a proxy and a portable Internet device. The proxy establishes an online connection with an instant messaging platform. The portable Internet device establishes an online connection with the proxy, and executes an instant messaging program, and transmits user ID information to the instant messaging platform through the proxy to complete a logon procedure, and the portable Internet device transmits data with the instant messaging platform through the proxy. If the proxy detects that the portable Internet device is at an idle state, then the proxy temporarily stores a data from the instant messaging platform to lower the frequency of receiving data by the portable Internet device.

Preferably, if the proxy detects that the portable Internet device exits the idle state, the proxy transmits the temporarily stored data to the portable Internet device.

If the display unit of the portable Internet device is in a non-view state, the executing instant messaging program notifies the proxy that the portable Internet device has entered into the idle state. If the display unit of the portable Internet device is in a view state, the executing instant messaging program notifies the proxy that the portable Internet device has exited the idle state.

Preferably, the display unit of the portable Internet device further comprises a backlight module and an LCD panel, and the display unit in a view state or non-view state is related to the power-on or power-off of the backlight module and the LCD panel.

Preferably, the proxy further receives a paging of the portable Internet device through a wireless communication base station connected to the portable Internet device, and determines whether or not the instant messaging program is still running according to the paging.

In summation of the description above, the power saving method of a portable Internet device, the portable Internet device and its instant messaging system in accordance with at least one embodiment of present invention has the following advantages:

(1) The embodiment of invention can reduce the power consumption of the instant messaging program effectively when the portable Internet device is idled.

(2) If the number of contact persons increases, the portable Internet device of the invention can reduce the increasing power consumption effectively.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a method, system and apparatus for providing a power saving method of a portable Internet device, the portable Internet device and its instant messaging system.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
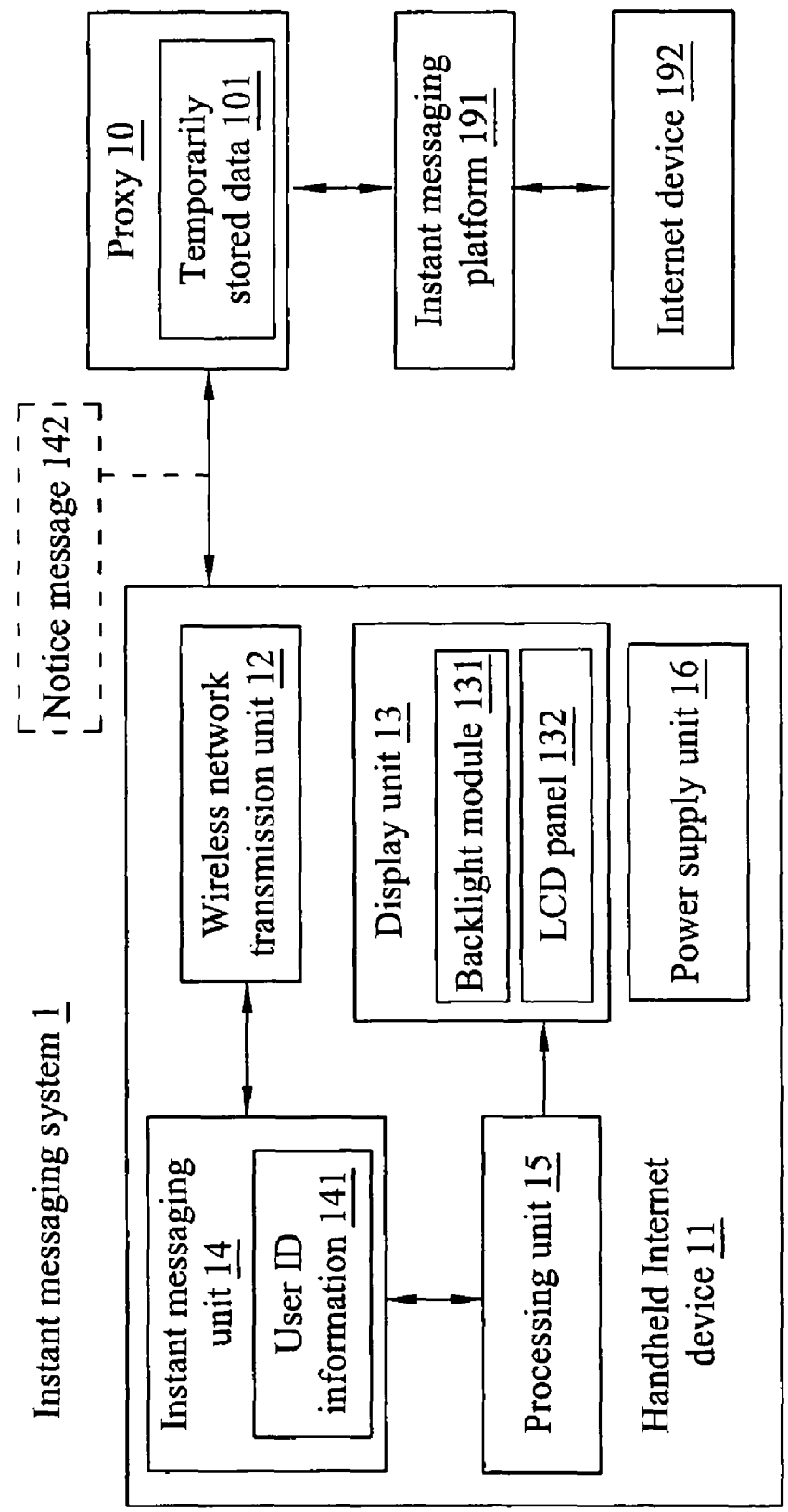
FIG. 1 is a block diagram of an instant messaging system in accordance with a first preferred embodiment of the present invention.

FIG. 1 illustrates a block diagram of an instant messaging system in accordance with a first embodiment of the present invention. The instant messaging system 1 comprises a portable Internet device 11 and a proxy 10. The portable Internet device 11 comprises a wireless network transmission unit 12, a display unit 13, an instant messaging unit 14, a processing unit 15 and a power supply unit 16. The power supply unit 16 is capable of supplying the electric power required for the operation of the portable Internet device 11. The instant messaging unit 14 is capable of establishing an online connection with the proxy 10 through the wireless network transmission unit 12 and transmitting user ID information 141 to an instant messaging platform 191 through the proxy 10 to complete a logon procedure, and the instant messaging unit 14 transmits data with the instant messaging platform 191 through the proxy 10 after completing the logon, and the proxy 10 receives data coming from the instant messaging platform 191 and then transmits the data to the instant messaging unit 14. It should be noted that the wireless network transmission unit 12 can be replaced by a cable network transmission unit.

For instance, the instant messaging unit 14 uploads the networking data of the portable Internet device 11, such as an IP address or a port ID, to the instant messaging platform 191 for being downloaded by an Internet device 192 at a remote end. Similarly, if a user's friend has used the Internet device 192 to logon the instant messaging platform 191, the instant messaging unit 14 can transmit position information and instant textual message to the Internet device 192 through the proxy 10, according to the networking data of the Internet device 192 stored in the instant messaging platform 191. In addition, the instant messaging unit 14 can enable or disable the conversation function of the instant messaging platform 191 through the proxy 10.

The processing unit 15 is electrically coupled to the wireless network transmission unit 12, the instant messaging unit 14 and the display unit 13, and the processing unit 15 is ooperable to control the display unit 13 to enter into a view state or a non-view state. For example, if the processing unit 15 has not received a trigger signal inputted by a user within a predetermined time, it means that the user does not operate the portable Internet device 11 within the predetermined time. To save power and extend the using time of the portable Internet device 11, the processing unit 15 can control the display unit 13 to enter into a non-view state to reduce the power consumption of the display unit 13. Since it is predicted that the user is not currently operating the portable Internet device 11, therefore the display unit 13 entered into the non-view state does not affect the user's feeling. If the display unit 13 enters into a non-view state, the portable Internet device 11 is considered to be in an idle state. If the processing unit 15 receives the user's inputted trigger signal later, then the processing unit 1 will control the display unit 13 to enter into a view state for the user's operation.

The display unit 13 comprises a backlight module 131 and an LCD panel 132. The display unit 13 in a view state or non-view state is related to a power-on or power-off of the backlight module 131 and the LCD panel 132, and such relationship can be defined by the designer of the portable Internet device 11. For instance, when both backlight module 131 and LCD panel 132 are turned off, then the display unit 13 is defined to be in the non-view state. If both backlight module 131 and LCD panel 132 are turned on, or the backlight module 131 is turned off and the LCD panel 132 is turned on, then the display unit 13 is defined to be in a view state. Besides, the designer also can define the display unit 13 to be in a non-view state, if the backlight module 131 is turned off and the LCD panel 132 is turned on.

If the display unit 13 is in the non-view state, it means that the user will not notice the real-time status of other contact persons on the instant messaging platform 191, and thus the instant messaging unit 14 can lower the message update frequency. Preferably, the instant messaging unit 14 can reduce the number of times of transmitting data with the instant messaging platform 191, or stop transmitting data with the instant messaging platform 191, so as to reduce the power consumption of the wireless network transmission unit 12. The instant messaging unit 14 generates and transmits a notice message 142 to the proxy 10 to notify the proxy 10 that the current portable Internet device 11 has entered into the idle state, so that the proxy 10 performs the corresponding action accordingly. For instance, the proxy 10 can temporarily stores the temporarily stored data 101 from the instant messaging platform 191, such as the updated data of contact persons, without transmitting the data directly to the instant messaging unit 14, until the instant messaging unit 14 notifies the proxy 10 to start transmitting the data. Therefore, the data receiving frequency of the portable Internet device can be reduced effectively and the temporarily stored data 101 further contains the most updated data only so that the data received by the instant messaging unit 14 can be the most updated data, and the data volume is lesser.

When the display unit 13 is returned to the view state, the instant messaging unit 14 also notifies the proxy 10 that the portable Internet device 11 has exited the idle state, so that the proxy 10 transmits the temporarily stored data 101 to the instant messaging unit 14.

Figure 2:
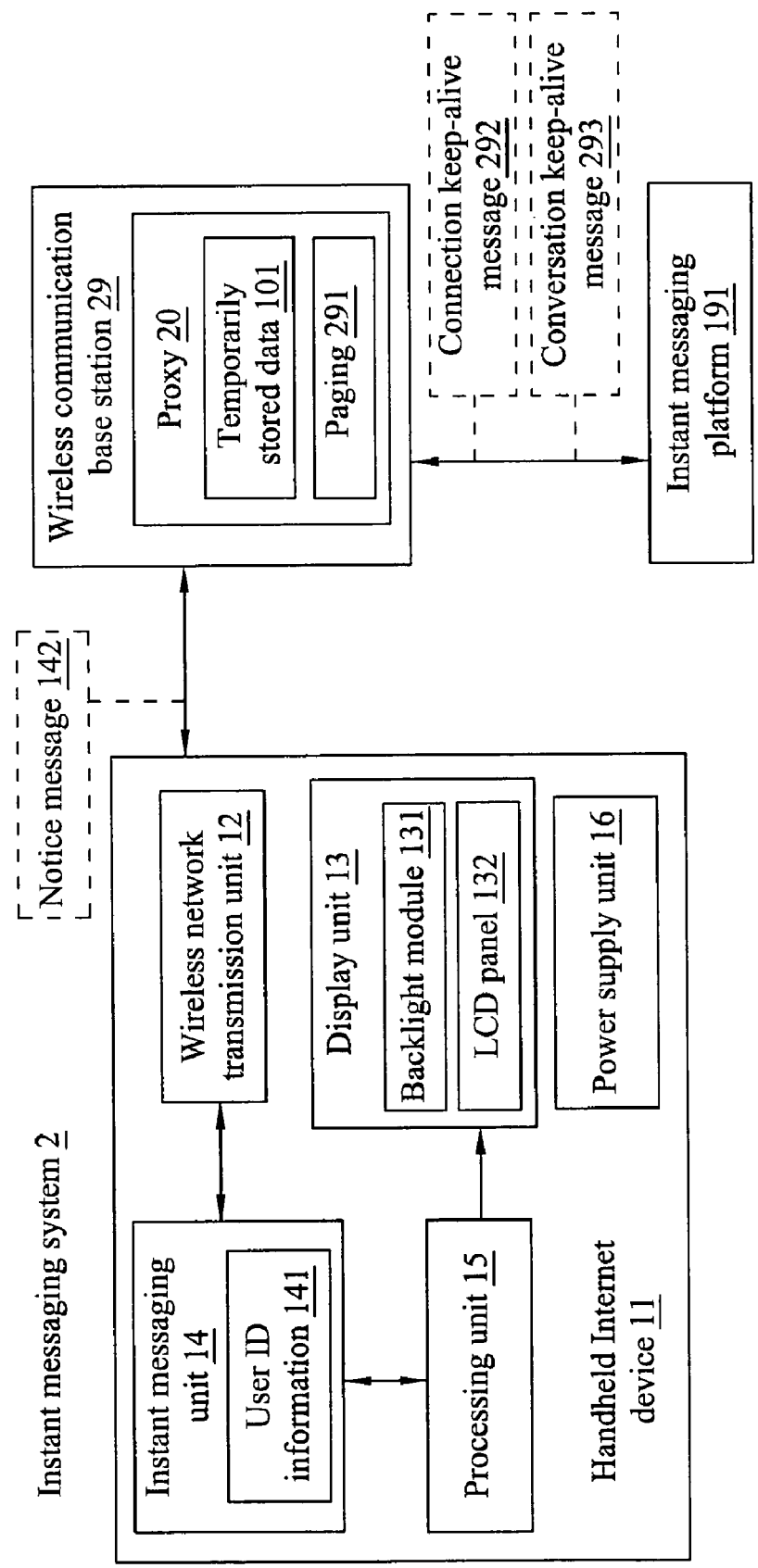
FIG. 2 is a block diagram of an instant messaging system in accordance with a second preferred embodiment of the present invention.

FIG. 2 illustrtaes a block diagram of an instant messaging system in accordance with a second embodiment of the present invention. Without the user's operation, the instant messaging unit 14 periodically transmits a connection keep-alive message 292 or a conversation keep-alive message 293 to the instant messaging platform 191 at the background operation. After the login, the instant messaging unit 14 periodically sends a packet of a connection keep-alive message 292 to the instant messaging platform 191 to inform the instant messaging platform 191 that the connection of the instant messaging unit 14 with the instant messaging platform 191 is not interrupted. If a user starts a conversation with any contact person, the instant messaging unit 14 also periodically sends the packet containing the conversation keep-alive message 293 to the instant messaging platform 191 to inform the instant messaging platform 191 that the conversation is not disconnected. However, periodically transmitting the aforementioned packets of keep-alive messages consumes a substantial quantity of electric power of the wireless network transmission unit 12.

In FIG. 2, the difference between the instant messaging system 2 and the instant messaging system 1 resides on that the proxy 20 is capable of receiving a paging 291 of the portable Internet device 11 through a wireless communication base station 29 connected to the portable Internet device 11. When the portable Internet device 11 starts to log on a wireless network, the portable Internet device 11 must establish an online connection with the wireless communication base station 29 first, and then the portable Internet device 11 periodically transmits a paging 291 with the wireless communication base station 29. Therefore, the proxy 20 can determine whether or not the instant messaging unit 14 is still operating according to the paging 291.

The function of instant messaging unit 14 to periodically transmit a connection keep-alive message or a conversation keep-alive message is disabled first, and the proxy 20 then is responsible for transmitting the connection keep-alive message to the instant messaging platform 191, or the proxy 20 transmits a conversation keep-alive message to the instant messaging platform 191 after the user initiates a conversation. Therefore, the invention can reduce the power consumption of the wireless network transmission unit 12, and the proxy 20 can process the following:

(i) When the proxy 20 determines that instant messaging unit 14 has logged out according to the paging 291, the proxy 20 stops transmitting the connection keep-alive message to the instant messaging platform 191, and transmits a logout message to the instant messaging platform 191.

(ii) If the proxy 20 determines that the instant messaging unit 14 cannot respond at this moment according to the paging 291, then the proxy 20 will wait for a preset time period, and if the instant messaging unit 14 still has no response within the preset time period, then the proxy 20 will stop transmitting a connection keep-alive message to the instant messaging platform 191, and transmit the logout message to the instant messaging platform 191.

(iii) When the user closes the conversation, the proxy 20 will stop transmitting the conversation keep-alive message to the instant messaging platform 191.

In addition to determining whether or not the instant messaging unit 14 is still operating according to the paging, the proxy 20, in accordance with a third embodiment of the present invention, can also keep transmitting a confirm signal to the portable Internet device 11, and determines whether or not the instant messaging unit 14 is still operating according to the successful transmission of the confirm signal, and this method is used instead of the determination method based on paging.

Preferably, the instant messaging unit 14 can be performing by a processor which is operable to execute an instant messaging program, or by a built-in instant messaging program chip, to provide the aforementioned instant messaging service. In the foregoing description, the instant messaging unit 14 under operation can be the instant messaging program executed by the processor, or a built-in instant messaging program chip under operation.

Figure 7:
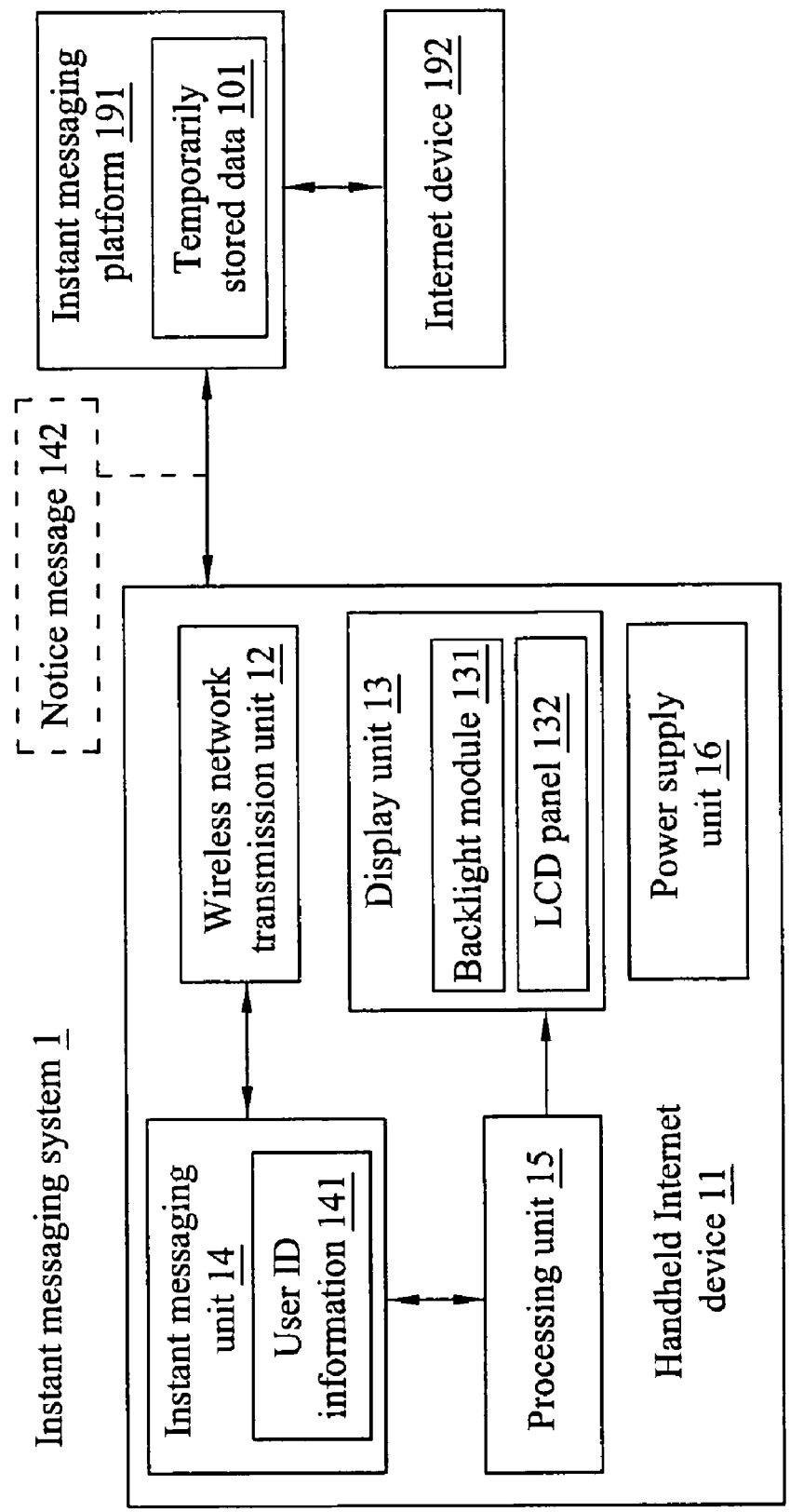
FIG. 7 is a block diagram of an instant messaging system in accordance with a fourth preferred embodiment of the present invention.

FIG. 7 illustrates a block diagram of an instant messaging system in accordance with a fourth embodiment of the present invention. The difference of the fourth embodiment from the previous embodiments resides on that the instant messaging unit 14 establishes an online connection with the instant messaging platform 191 through the wireless network transmission unit 12 and transmits user ID information 141 to the instant messaging platform 191 to complete a logon procedure, and the instant messaging unit 14 transmits data with the instant messaging platform 191 after the logon. If the display unit 13 is in a non-view state, the instant messaging unit 14 generates and transmits a notice message 142 to the instant messaging platform 191 to notify the instant messaging platform 191 that the current portable Internet device 11 has entered into an idle state, such that the instant messaging platform 191 takes a corresponding action accordingly. For instance, the instant messaging platform 191 can temporarily stores a temporarily stored data 101 which is desired to be transmitted to the portable Internet device 11, such as the updated data of the status of other contact persons, and the instant messaging platform 191 stops transmitting the temporarily stored data 101 to the portable Internet device 11 until the instant messaging platform 191 is notified to resume the transmission of data to the portable Internet device 11, so that the frequency of receiving data by the portable Internet device 11 can be reduced efficiently. The rest of the fourth preferred embodiment is similar to the first preferred embodiment, and thus will not be described in detail here again.

While the instant messaging unit 14 lowers the message update frequency, the proxy 10 is able to solve the problem caused by lowering the message update frequency, but the proxy 10 is not a necessary device for such implementation. It should be noted that the instant messaging unit 14 can lower the message update frequency without the proxy 10 to achieve the power saving effect of the portable Internet device 11.

Figure 3:
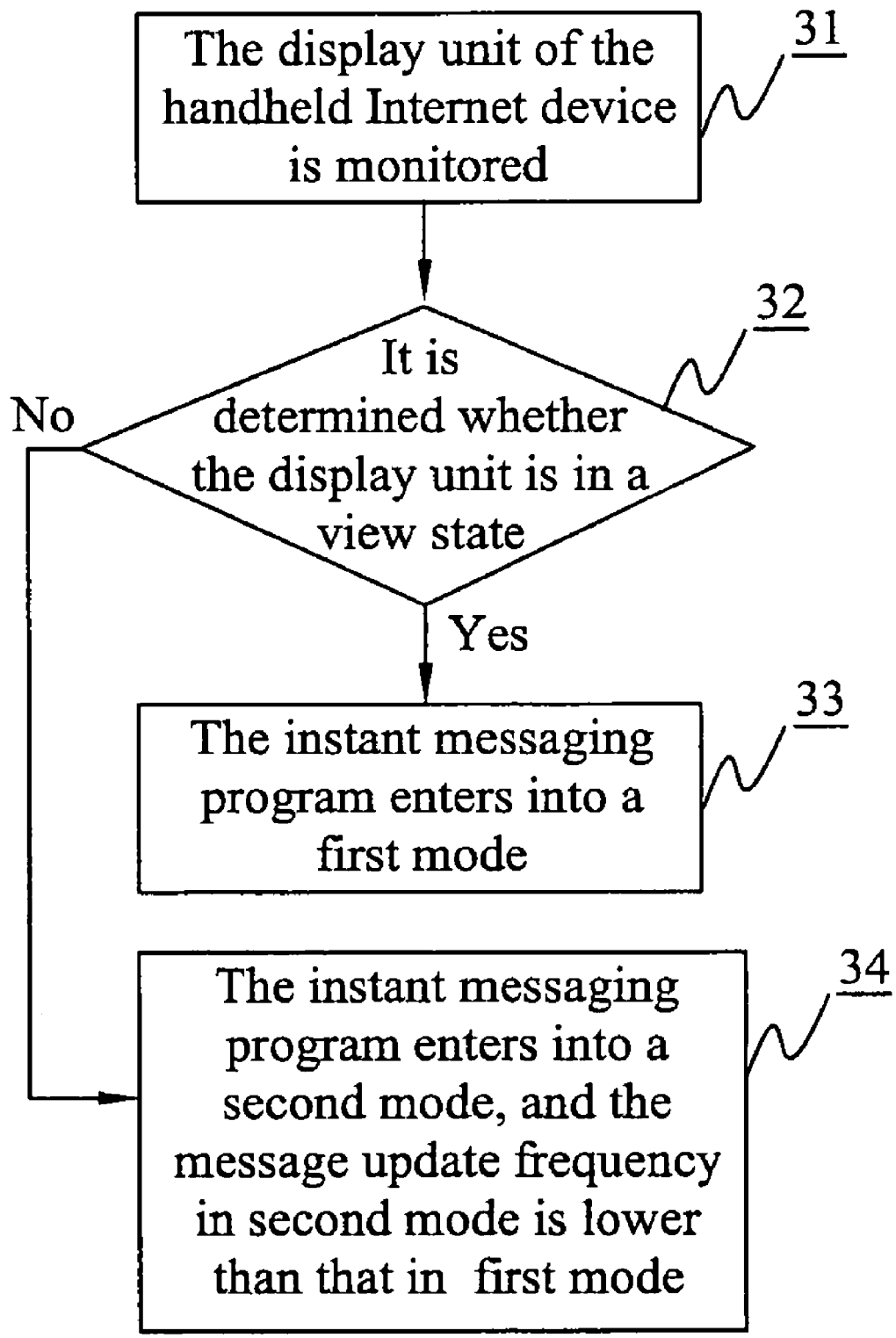
FIG. 3 is a flow chart of a power saving method of a portable Internet device in accordance with the present invention.

FIG. 3 illustrates a flow chart of a power saving method of a portable Internet device in accordance with the present invention. The power saving method comprises the following steps. In Step 31, the display unit of the portable Internet device is monitored, and the portable Internet device is operable to execute an instant messaging program to transmit user ID information to the instant messaging platform to complete a logon procedure, and the instant messaging platform performs a data transmission after the logon. In Step 32, it is determined whether or not the display unit is in a view state. If the display unit is in the view state, it means that user can view the displayed screen, for example, both backlight module and LCD panel of the display unit are turned on, the instant messaging program then is controlled to enter into a first mode in step 33, The first mode is the operating mode for the instant messaging program to transmit and receive data normally. If the display unit is in a non-view state, it means that the user can not view the displayed screen, for example, both backlight module and LCD panel of the display unit are turned off, the instant messaging program then enters into a second mode in step 34, and the message update frequency of the instant messaging program in the second mode is lower than the message update frequency of the instant messaging program in the first mode. For instance, the instant messaging program can notify the instant messaging platform that the portable Internet device has entered into the second mode, and the instant messaging platform then temporarily stores the data to be transmitted to the portable Internet device and stop transmitting data with the portable Internet device until the instant messaging platform is notified to resume the transmission of data to the portable Internet device. Therefore, the data receiving frequency of the portable Internet device can be reduced.

By the abovementioned embodiment of the present invention, when the portable Internet device is idled by users for a long time to enter into the idle mode and the display unit is in the non-view state, the portable Internet device can lower the message update frequency or stop transmitting wireless data to reduce the power consumption of the portable Internet device.

Figure 4:
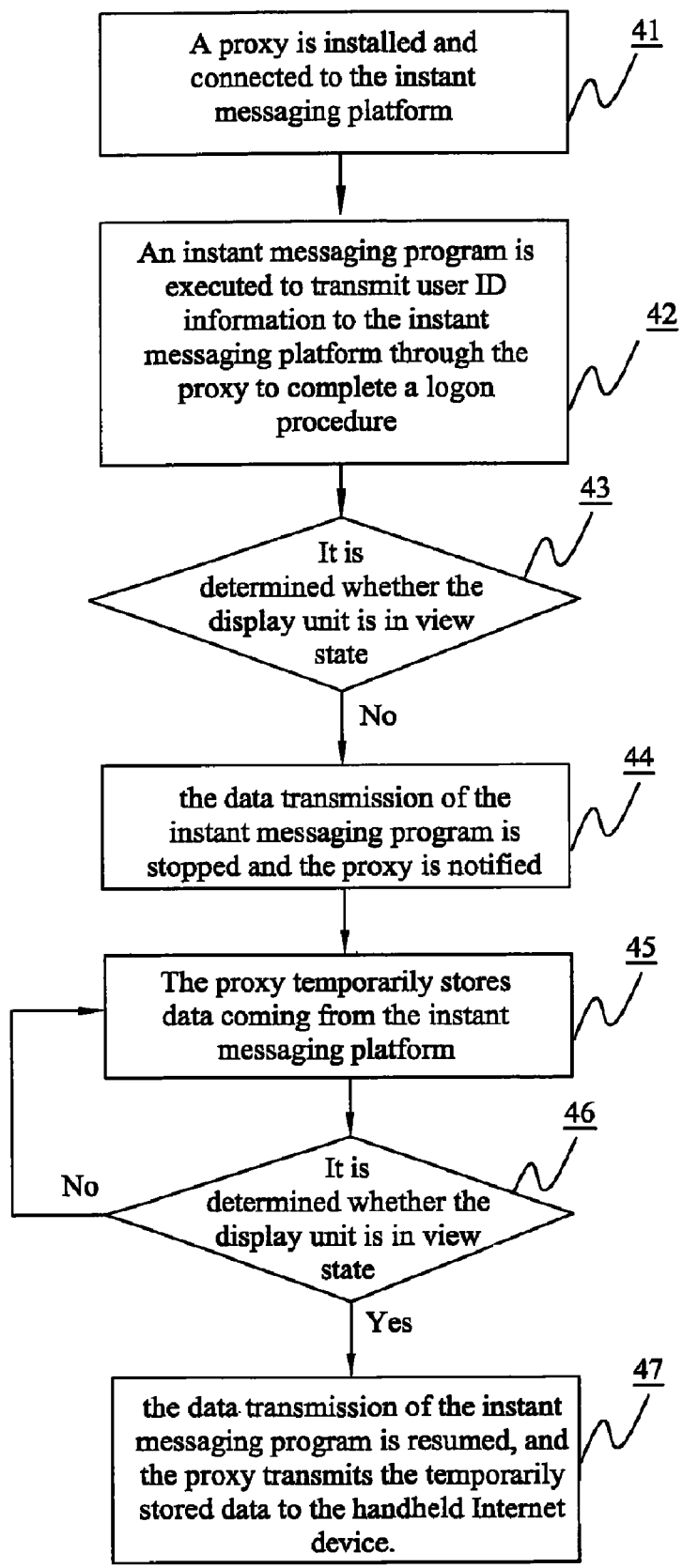
FIG. 4 is a flow chart of a power saving method of a portable Internet device in accordance with a first preferred embodiment of the present invention.

FIG. 4 illustrates a flow chart of a power saving method of a portable Internet device in accordance with a first embodiment of the present invention. The power saving method is applied to a portable Internet device and comprises the following steps. In Step 41, a proxy is installed and connected to the instant messaging platform. In Step 42, an instant messaging program is executed to transmit user ID information to the instant messaging platform through the proxy to complete a logon procedure, and the proxy is then responsible to transmit data with the instant messaging platform. In Step 43, it is determined whether or not the display unit is in a view state. If the display unit is in a non-view state, then in step 44 the data transmission or receiving of the instant messaging program is stopped and the proxy is notified. In step 45, the proxy temporarily stores data coming from the instant messaging platform. Preferably, the temporarily stored data contains the most updated data only. In Step 46, it is determined whether or not the display unit is in the view state; if no, then Step 45 is executed; if yes, then in step 47 the data transmission or receiving of the instant messaging program is resumed, and the proxy transmits the temporarily stored data to the portable Internet device.

Figure 5:
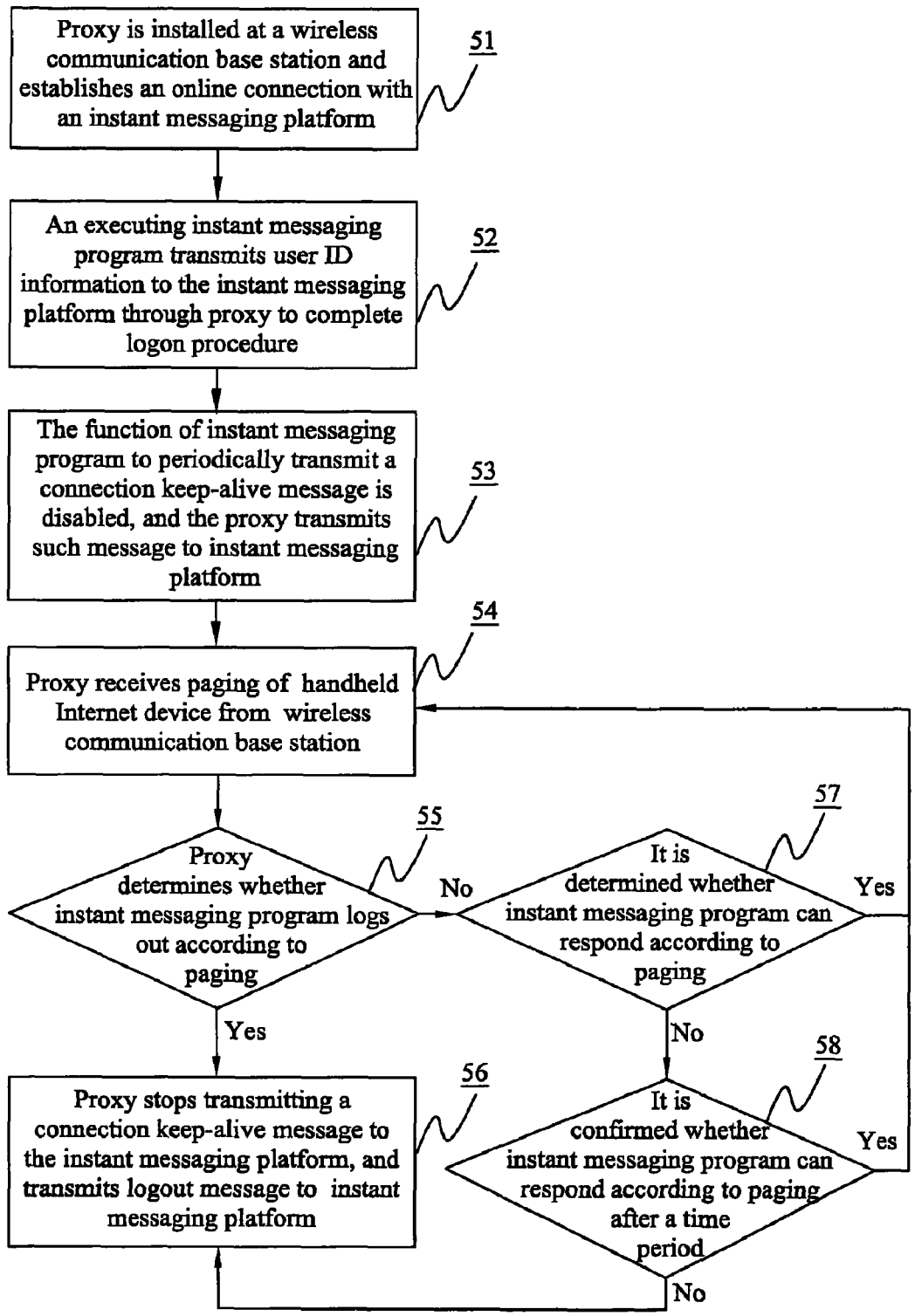
FIG. 5 is a flow chart of a power saving method of a portable Internet device in accordance with a second preferred embodiment of the present invention.

FIG. 5 illustrates a flow chart of a power saving method of a portable Internet device in accordance with a second embodiment of the present invention. The power saving method is applied to a portable Internet device and comprises the following steps. In Step 51, a proxy is installed at a wireless communication base station and establishes an online connection with an instant messaging platform. In Step 52, an instant messaging program is executed to transmit user ID information to the instant messaging platform through the proxy to complete a logon procedure, and then transmit data with the instant messaging platform through the proxy. In Step 53, the function of the instant messaging program to periodically transmit a connection keep-alive message is disabled, and the proxy transmits the connection keep-alive message to the instant messaging platform. In Step 54, the proxy receives a paging of the portable Internet device from the wireless communication base station. In Step 55, the proxy determines whether or not the instant messaging program has logged out according to the paging; if yes, then in step 56 the proxy stops transmitting a connection keep-alive message to the instant messaging platform, and transmits a logout message to the instant messaging platform; if not, it is determined whether or not the instant messaging program can respond according to the paging in step 57; and if the instant messaging program can respond, then Step 54 is executed.

If the instant messaging program cannot respond, then in step 58 it is confirmed whether or not the instant messaging program can respond according to the paging after a time period; if yes, then step 54 is executed, or else step 56 is executed.

After the user initiates a conversation, the proxy also periodically transmits a conversation keep-alive message to the instant messaging platform. If the proxy determines that the instant messaging program has logged out according to the paging, then the proxy will stop transmitting the conversation keep-alive message to the instant messaging platform.

Figure 6:
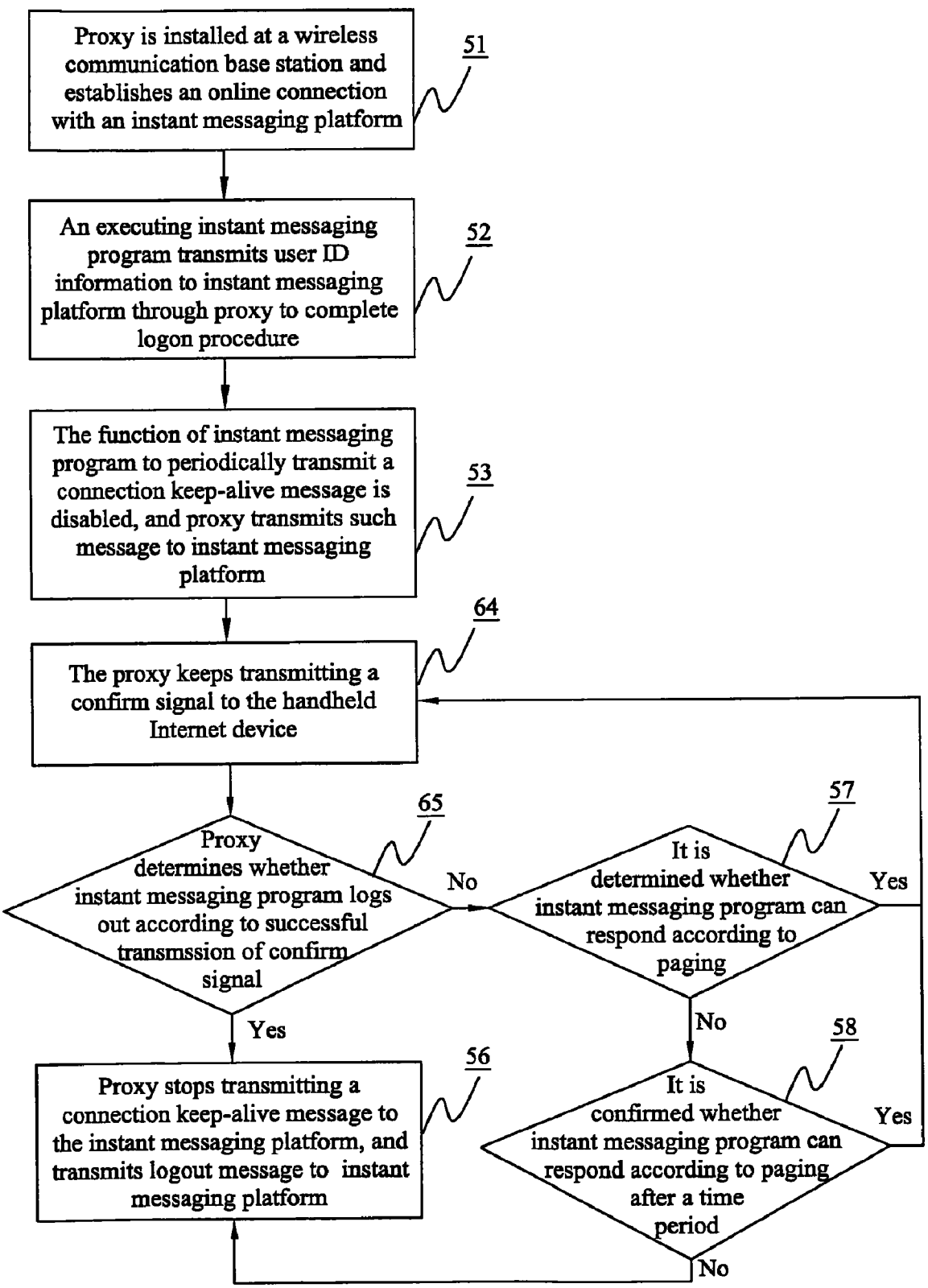
FIG. 6 is a flow chart of a power saving method of a portable Internet device in accordance with a third preferred embodiment of the present invention.

FIG. 6 illustrates a flow chart of a power saving method of a portable Internet device in accordance with a third embodiment of the present invention. The difference of the third embodiment from the second embodiment resides on that step 64 and step 65 replace step 54 and step 55. In step 64, the proxy keeps transmitting a confirm signal to the portable Internet device. In step 65, the proxy determines whether or not the instant messaging program has logged out according to the determination of whether or not the confirm signal is transmitted successfully; if yes, step 56 is executed, or else step 57 is executed.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A power saving method for sending and receiving instant messages from a portable Internet device using an instant messaging program comprising:
   monitoring a display unit of the portable Internet device;
   controlling the instant messaging program to enter into a first mode, when the display unit is in a view state;
   controlling the instant messaging program to enter into a second mode, when the display unit is in a non-view state;
   providing a proxy;
   connecting the proxy while the instant messaging prgram is executed;
   transmitting a user ID information to an instant messaging platform through the proxy to complete a logon procedure; and
   transmitting a data to the instant messaging platform through the proxy;
   wherein the message update frequency of the instant messaging program in the second mode is lower than the message update frequency in the first mode, wherein the proxy receives a paging of the portable Internet device through a wireless communication base station connected to the portable Internet device to determine whether or not the instant messaging program is still running according to the paging and then disable the function of the instant messaging program for periodically transmitting a connection keep-alive message or a conversation keep-alive message, and selectively transmitting the connection keep-alive message or the conversation keep-alive message by the proxy to the instant messaging platform according to the determination result.

2. The power saving method of claim 1, wherein the display unit comprises a backlight module and an LCD panel, and the view state is when the backlight module is lit, and the non-view state is when the backlight module is not lit.

3. The power saving method of claim 1, further comprising a step of temporarily storing a data coming from the instant messaging platform in the proxy to lower the data receiving frequency of the portable Internet device, when the instant messaging program enters into the second mode.

4. The power saving method of claim 3, further comprising a step of transmitting a temporarily stored data to the portable Internet device by the proxy, when the instant messaging program returns to the first mode from the second mode.

5. The power saving method of claim 4, wherein the temporarily stored data is the most updated data only.

6. The power saving method of claim 1, wherein the instant messaging program connects to an instant messaging platform when being executed, and transmits a user ID information to the instant messaging platform to complete a logon procedure, and performs a data transmission with the instant messaging platform, and when the instant messaging program enters into the second mode, the instant messaging platform temporarily stores a data to be transmitted to the portable Internet device, so as to lower the frequency of receiving data by the portable Internet device.

7. A power saving method for sending and receiving instant messages from a portable Internet device using an instant messaging program comprising:
   monitoring a display unit of the portable Internet device;
   controlling the instant messaging program to enter into a first mode, when the display unit is in a view state;
   controlling the instant messaging program to enter into a second mode, when the display unit is in a non-view state;
   providing a proxy;
   connecting the proxy while the instant messaging program is executed;
   transmitting a user ID information to an instant messaging platform through the proxy to complete a logon procedure; and
   transmitting a data to the instant messaging platform through the proxy;
   wherein the message update frequency of the instant messaging program in the second mode is lower than the message update frequency in the first mode, wherein the proxy keeps transmitting a confirm signal to the portable Internet device and determines whether or not the instant messaging program code is still operated according to a determination of whether or not the confirm signal is transmitted successfully.

8. The power saving method of claim 7, further comprising the step of disabling the function of the instant messaging program for periodically transmitting a connection keep-alive message or a conversation keep-alive message, and selectively transmitting the connection keep-alive message or the conversation keep-alive message by the proxy to the instant messaging platform according to the determination result.

9. An instant messaging system, comprising:
   a proxy capable pf establishing an online connection with an instant messaging platform; and
   a portable Internet device, communicating with the proxy, capable of establishing an online connection with the proxy, and executing an instant messaging program, and transmitting a user ID information to the instant messaging platform through the proxy to complete a logon procedure, and the portable Internet device transmitting data with the instant messaging platform through the proxy;
   wherein when the proxy detects the portable Internet device entering into an idle state, then the proxy temporarily stores a data from the instant messaging platform to lower the data receiving frequency of the portable Internet device,
   wherein the proxy receives a paging of the portable Internet device through a wireless communication base station coupled to the portable Internet device, and determines whether or not the instant messaging program code is still operated according to the paging,
   wherein the executing instant messaging program disables the function of periodically transmitting a connection keep-alive message or a conversation keep-alive message, and the proxy selectively transmits the connection keep-alive message or the conversation keep-alive message to the instant messaging platform according to the determination result.

10. The instant messaging system of claim 9, wherein the proxy transmits the temporarily stored data to the portable Internet device when the proxy detects that the portable Internet device has exited the idle state.

11. The instant messaging system of claim 9, wherein the executing instant messaging program notifies the proxy that the portable Internet device has entered into an idle state when the display unit of the portable Internet device is in a non-view state; and the executing instant messaging program notifies the proxy that the portable Internet device has exited the idle state when the display unit of the portable Internet device is in a view state.

12. The instant messaging system of claim 11, wherein the display unit of the portable Internet device comprises a backlight module and an LCD panel, and the view state is when the backlight module is lit, and the non-view state is when the backlight module is not lit.

13. The instant messaging system of claim 9, wherein the temporarily stored data is the most updated data only.

14. An instant messaging system, comprising:
- a proxy capable pf establishing an online connection with an instant messaging platform; and
- a portable Internet device, communicating with the proxy, capable of establishing an online connection with the proxy, and executing an instant messaging program, and transmitting a user ID information to the instant messaging platform through the proxy to complete a logon procedure, and the portable Internet device transmitting data with the instant messaging platform through the proxy;
- wherein when the proxy detects the portable Internet device entering into an idle state, then the proxy temporarily stores a data from the instant messaging platform to lower the data receiving frequency of the portable Internet device, wherein the proxy keeps transmitting a confirm signal to the portable Internet device, and determines whether or not the instant messaging program code is still operated according to the determination of successfully transmitting the confirm signal.

15. The instant messaging system of claim 14, wherein the executing instant messaging program disables the function of periodically transmitting a connection keep-alive message or a conversation keep-alive message, and the proxy selectively transmits the connection keep-alive message or the conversation keep-alive message to the instant messaging platform according to the determination result.

\* \* \* \* \*